(No Model.)
J. A. SHOWERS.
SHIELD FOR LISTED CORN.
No. 363,426. Patented May 24, 1887.
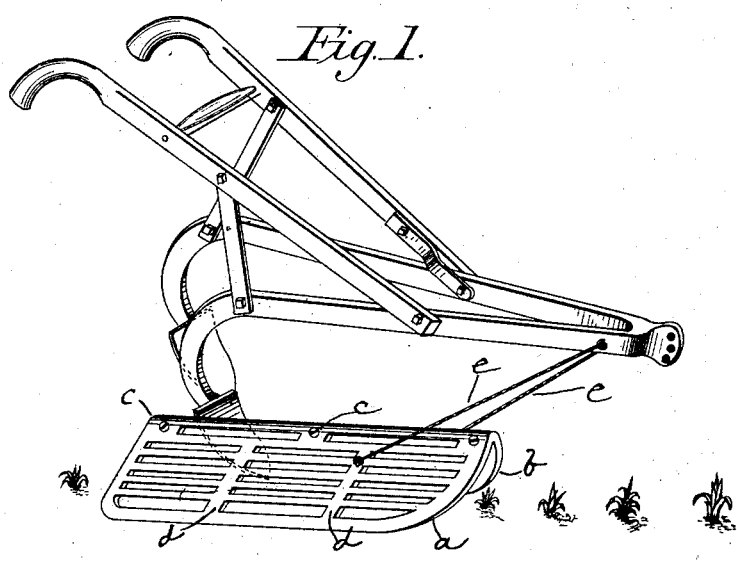
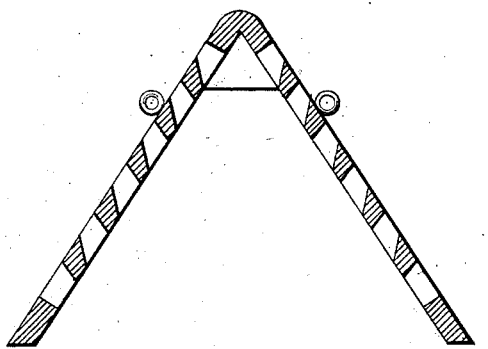
Witnesses:
William G. Austin
James H. Dowell
Inventor:
John A. Showers

UNITED STATES PATENT OFFICE.

JOHN A. SHOWERS, OF COIN, IOWA.

SHIELD FOR LISTED CORN.

SPECIFICATION forming part of Letters Patent No. 363,426, dated May 24, 1887.

Application filed September 17, 1886. Serial No. 213,953. (No model.)

*To all whom it may concern:*

Be it known that I, JOHN A. SHOWERS, a citizen of the United States, residing at Coin, in the county of Page and State of Iowa, have invented a new and useful Plant-Fender to Facilitate the Cultivation of Corn and other Plants, of which the following is a specification.

My invention relates to improvements in arched fenders or shields for plants; and the object of my improvement is to provide a fender or shield so constructed as to prevent young plants from being covered with clods or dirt in cultivation. I attain this object by the mechanism illustrated by the accompanying drawings, in which—

Figure 1 is a perspective view of my invention attached to a cultivator. Fig. 2 is a vertical sectional view taken across the shield.

The shield is preferably constructed of cast-iron and is cast in two pieces, $a$ and $b$ being the respective sides of the shield, which is formed by attaching the corresponding sides, which are longitudinally curved inward at top, so that when bolted or fastened together to collars or plates, as at $c$, the shield is slightly arching at the top.

The sides of the shield are cast so as to form bars lengthwise of the shield, being joined together at the ends and at two places, $d$, equidistant from the ends, thereby forming braces to the bars and with sufficient openings between each bar. The bars are beveled inward on the lower edge, thereby increasing the space between the bars, so that dirt may readily fall through. The bars are also beveled outward at the upper edge, thereby forming a knife-like or sharp edge for better pulverizing the dirt passing over the shield; and the outer and inner bevels are parallel, and when the shield is set on a level the lines of the bevels are perpendicular.

The shield or fender is attached to a cultivator by means of ropes or chains $e$, attached to the sides of the shield at suitable distances from the front end thereof.

I am aware that prior to my invention plant-fenders have been constructed of solid plates, and also made with slots or openings. I therefore do not claim such a combination, broadly; but What I do claim as my invention, and desire to secure by Letters Patent, is—

1. An arched fender or shield for plants, having narrow open spaces extending along its length, said openings increasing in width from the outer to the inner surface, substantially as shown and described.

2. A plant-shield having longitudinal openings increasing in width from the outer surface inward, whereby a knife or cutting-edge is produced upon the bars dividing said spaces, substantially as shown and described.

JOHN A. SHOWERS.

Witnesses:
JAMES H. DOWELL,
WILLIAM G. AUSTIN.